Oct. 15, 1963 KENJI SUETSUGU 3,107,280
MAGNETIC TAPE RECORDER
Filed Nov. 1, 1960
FIG. 1
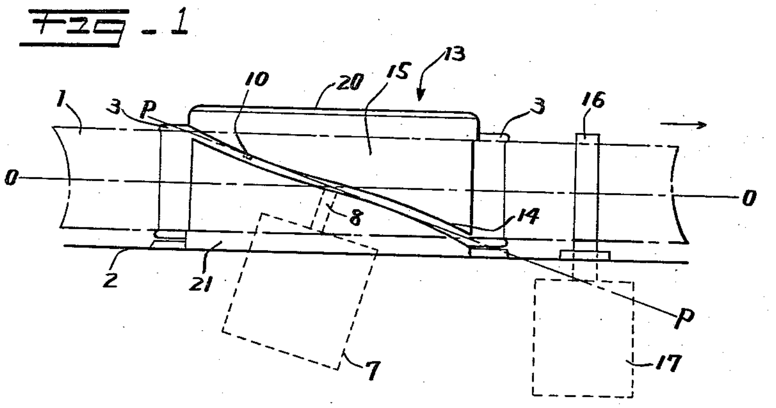
FIG. 3
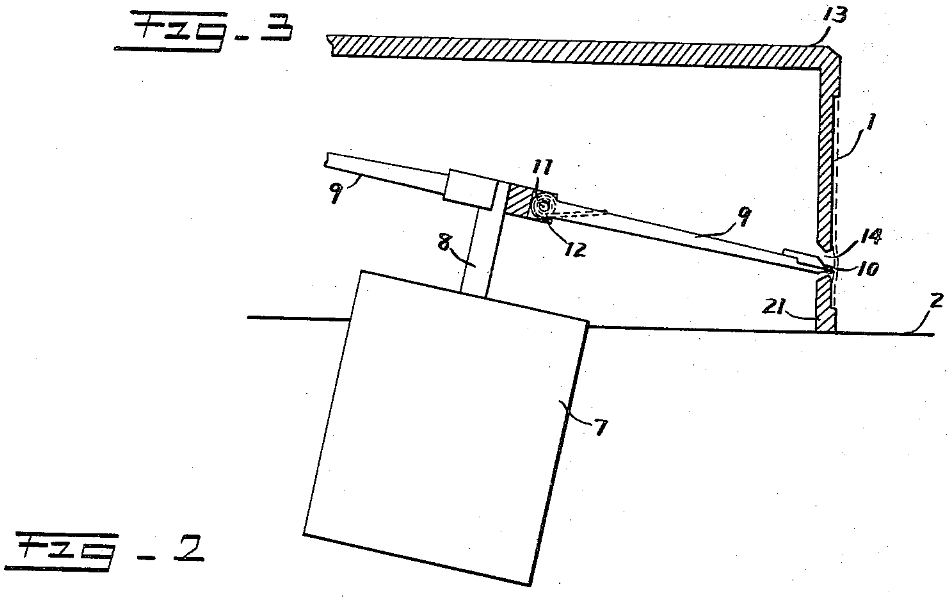
FIG. 2
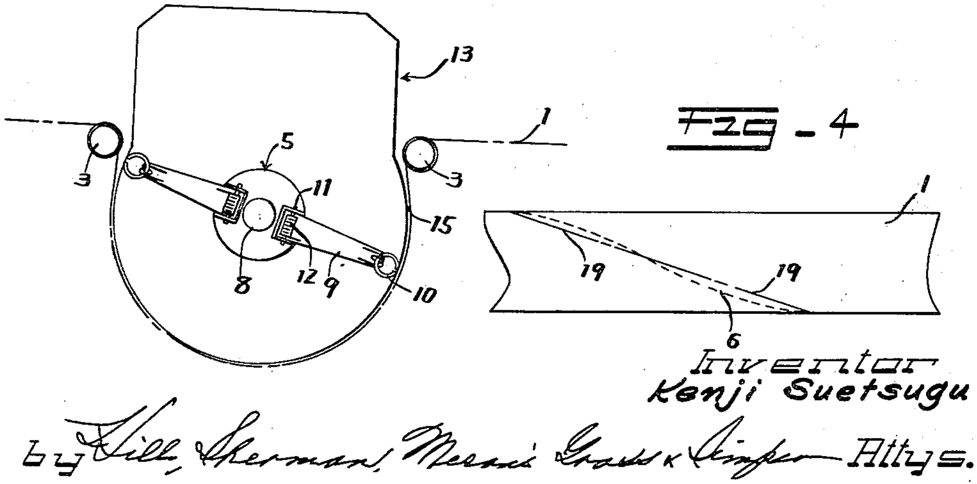
FIG. 4
Inventor
Kenji Suetsugu
by Hill, Sherman, Meroni, Gross & Simpson Attys.

3,107,280

MAGNETIC TAPE RECORDER

Kenji Suetsugu, Tokyo, Japan, assignor to Sony Corporation, Shinagawa-ku, Tokyo, Japan, a corporation of Japan Filed Nov. 1, 1960, Ser. No. 66,528
Claims priority, application Japan Nov. 6, 1959
2 Claims. (Cl. 179—100.2)

This invention relates to magnetic tape recorders and, more particularly to a magnetic tape recorder of video signals.

In one type of apparatus for recording video signals on a magnetic tape, the tape transport path includes an arcuate tape contacting surface. A slot or groove is formed in this surface which crosses the surface at an inclined angle to the direction of motion of the tape. A group of magnetic heads are mounted on a rotating member and extend through the slot and wipe diagonally across the tape.

While this arrangement works satisfactorily, it has the disadvantage that the path or track of each head across the tape follows a sinusoidal path. Therefore, the distance between the individual scanning lines is reduced at the upper and lower margins of the tape which sometimes produces cross-talk and other difficulties.

Accordingly, it is an object of this invention to provide such a recorder wherein the track or path of the magnetic heads across the tape is substantially linear.

It is another object of this invention to provide a magnetic recorder which is simple in construction, and accurate and reliable in operation.

It is still another object of this invention to provide a magnetic tape recorder which is especially adapted for recording video signals on magnetic tape.

Further objects, features and advantages of this invention will be more apparent from the following detailed description taken in conjunction with the accompanying figures of the drawings in which:

FIGURE 1 is a front view of a tape recorder constructed in accordance with one embodiment of this invention;

FIGURE 2 is a plan view of the tape recorder shown in FIGURE 1;

FIGURE 3 is a view partially in section of a portion of the recorder; and

FIGURE 4 is a diagram that illustrates the operation of the recorder.

With reference to the drawings, a magnetic tape 1 is drawn from left to right as seen in FIGURE 1 around two tape guide rollers 3 and a guide drum 13, which are mounted on a base plate 2. The magnetic tape 1 will not be subjected to torsion or stress on any part while traveling in this path.

A rotary member 5 is mounted adjacent to the guide drum 13 and includes a drive motor 7, a drive shaft 8, and a plurality of arms 9 which are fastened to the shaft 8. The line P—P, FIGURE 1, is perpendicular to the axis of the shaft 8, and it is inclined relative to the line O—O which is the line of travel of the tape 1. Mounted on the end of each arm 9 is a magnetic head 10 which has a narrow gap formed in it.

The guide drum 13 is formed in two parts 20 and 21 which have a slot or groove 14 formed between them. The member 5 is positioned adjacent the drum 13 so that the magnetic heads 10 are able to extend through the slot 14 as shown in FIGURE 3.

If the arms 9 were to rotate in the plane of the line P—P, the magnetic heads would follow a circular path and wipe across the tape 1. The scanning line or trace on the tape would follow a sinusoidal path as shown by the dotted line 6 in FIGURE 4. Such a motion would cause the space between the scanning lines to become very small and possibly permit cross-talk at the uppermost and lowermost margins of the tape.

To overcome this difficulty, the guide slot 14 is formed in such a manner that the scanning line of a head 10 on the tape is linear. As can be seen from FIGURE 1, the shape of the guide slot 14 is sinusoidal but it is 180° out of phase with the line 6. Therefore, the heads are forced out of the plane of the line P—P and the scanning line on the tape is linear as shown by the line 19, FIGURE 4.

As previously stated, the magnetic heads 10 are mounted on the free ends of the opposed arms 9 which are, in turn, mounted on the shaft 8 of the driving motor 7. As shown in FIGURES 2 and 3, one end of each arm 9 is connected to the revolving shaft 8 by a pin 11 and a spring 12 which urges the arm downwardly. The arms 9 are able to rotate slightly about the axes of the pins 11 and follow the path of the slot 14.

The arc of contact between each of the heads 10 and the tape 1 can be selected as desire, but it is preferable that, when two heads are used, each head contact the tape during approximately one-half of its circumferential travel. The guide rollers 3 can be positioned to obtain the desired arc of contact. It is apparent, of course, that any number of magnetic heads can be provide. They should be spaced at equal angular distances around the circumference of a circle and the arc of contact with the tape should be adjusted accordingly.

In operation, the magnetic tape 1 is drawn from left to right as seen in FIGURE 1 around the guide rollers 3 and along the tape contact surface 15 on the guide drum 13 by a capstan roller 16. The capstan roller 16 is driven by a capstan driving motor 17 and cooperates with a pinch roller (not shown) in the well known manner.

In this arrangement the shaft 8 is rotated in a counterclockwise direction as seen in FIGURE 2 while the magnetic heads are energized by video signals. Any suitable mechanism (not shown) such as slip rings can be used to connect the signals to the revolving magnetic heads from the stationary parts. The video signals are magnetically recorded on the tape 1 when the heads 10 are driven by the motor 7 and the tape is driven by the capstan driving motor 17. The magnetic scanning line or track on the tape will be a straight line as shown by the line 19 in FIGURE 4.

The tangential velocity of the rotating magnetic heads is much higher than the velocity of the magnetic tape 1. When the tape 1 runs in the same direction as the heads 10, as described, the line or trace 19 will have an increasing inclination angle as the tape speed is increased relative to the heads.

It should be understood that the guide drum 13 can be a single member with a slot in it rather than two members 20 and 21 with an opening between them as described.

It can be seen that the magnetic tape is not subjected to torsion or stress on any part while recording using this mechanism. Therefore, the magnetic signals can be recorded and later reproduced accurately without a discrepancy between the scanning positions during the recording and reproducing processes, which might otherwise happen due to a partial extension, shrinkage or the like of the tape.

Furthermore, the video signals are recorded on a linear line or trace of the tape 1 at regular intervals with the result that interference between the adjacent lines is avoided.

It will be understood that modifications and variations may be effected without departing from the scope of the novel concepts of this invention.

I claim as my invention:

1. A tape transducing apparatus comprising (a) an elongated tape for movement in the direction of its length dimension, (b) tape guiding means for guiding said tape for movement along an arcuate tape path of configuration substantially conforming to a portion of a cylindrical surface, (c) a plurality of transducer heads for scanning cooperation with the portion of the length of said tape moving along said arcuate tape path, (d) means mounting said heads for rotation about a head rotation axis disposed obliquely to the length dimension of the tape at said tape guiding means and tending to provide for orbital head movement in a plane of head rotation lying at right angles to said head rotation axis, (e) means for rotating said heads about said obliquely disposed head rotation axis to move the heads successively across the tape and thus trace successive scanning lines extending obliquely across said tape, (f) said mounting means mounting said heads with substantial freedom of movement in a direction transverse to the plane of head rotation, and (g) head guiding means for guiding said heads as they move across said tape, said head guiding means having an irregular generally sinusoidal configuration but which configuration defines a substantially straight line with respect to a flat plane development thereof, and said head guiding means displacing the successive heads from said plane of head rotation in one transverse direction as they travel along a first part of the transverse extent of the tape and displacing the heads from the plane of head rotation in an opposite transverse direction as they travel along a second part of the transverse extent of the tape and thus guiding the heads to trace straight oblique scanning lines on the tape with respect to a flat planar condition of the tape.

2. A tape transducing apparatus comprising (a) a tape guide member having an exterior arcuate tape guiding surface for guiding an elongated tape for movement along an arcuate tape path of configuration substantially conforming to a portion of a cylindrical surface, (b) a plurality of transducer heads for scanning cooperation with the undersurface of the portion of the length of said tape moving along said arcuate tape guiding surface, (c) means mounting said heads for rotation about a head rotation axis disposed obliquely to the axis of said arcuate tape guiding surface and tending to provide for orbital head movement in a plane of head rotation lying at right angles to said head rotation axis, (d) means for rotating said heads about said obliquely disposed head rotation axis to move the heads successively across the tape and thus to trace successive scanning lines extending obliquely across said tape, (e) said mounting means mounting said heads with substantial freedom of movement in a direction transverse to the plane of head rotation, and (f) said arcuate tape guiding surface having an elongated slot therein for receiving said heads as they move across the undersurface of said tape, said head guiding slot being defined by an elongated head engaging surface having an irregular generally sinusoidal configuration but which configuration defines a substantially straight line with respect to a flat plane development thereof, and said head engaging surface displacing the successive heads from said plane of head rotation in one transverse direction as the heads travel along a first part of the transverse extent of the tape and displacing the heads from the plane of head rotation in an opposite transverse direction as the heads travel along a second part of the transverse extent of the tape and thus guiding the heads to trace straight oblique scanning lines on the tape with respect to a flat planar condition of the tape.

References Cited in the file of this patent

UNITED STATES PATENTS

| | | |
|---|---|---|
| 2,352,023 | Schuller | June 20, 1944 |
| 2,773,120 | Masterson | Dec. 4, 1956 |
| 2,909,616 | Marty | Oct. 20, 1959 |
| 2,915,596 | Lyon | Dec. 1, 1959 |
| 2,985,713 | Wehde | May 23, 1961 |